US010625762B2

(12) United States Patent
Chapus

(10) Patent No.: US 10,625,762 B2
(45) Date of Patent: Apr. 21, 2020

(54) ALL-IN-ONE BEACH CART

(71) Applicant: CJB REVOLUTION, Vieille-Toulouse (FR)

(72) Inventor: Charles Chapus, Toulouse (FR)

(73) Assignee: CJB Revoluation, Vieille-Toulouse (FR)

(*) Notice: Subject to any disclaimer, the term of this patent is extended or adjusted under 35 U.S.C. 154(b) by 0 days.

(21) Appl. No.: 16/176,367

(22) Filed: Oct. 31, 2018

(65) Prior Publication Data

US 2019/0126963 A1   May 2, 2019

(30) Foreign Application Priority Data

Oct. 31, 2017  (FR) ..................... 17 60283

(51) Int. Cl.
| | |
|---|---|
| *B62B 1/20* | (2006.01) |
| *B62B 5/00* | (2006.01) |
| *B62B 5/04* | (2006.01) |
| *A47C 7/66* | (2006.01) |
| *B62B 1/12* | (2006.01) |
| *A47C 4/54* | (2006.01) |
| *A47C 1/14* | (2006.01) |
| *B62B 5/08* | (2006.01) |
| *B62B 5/06* | (2006.01) |

(52) U.S. Cl.
CPC ............... *B62B 1/20* (2013.01); *A47C 1/14* (2013.01); *A47C 4/54* (2013.01); *A47C 7/66* (2013.01); *B62B 1/12* (2013.01); *B62B 5/00* (2013.01); *B62B 5/0013* (2013.01); *B62B 5/049* (2013.01); *B62B 5/065* (2013.01); *B62B 5/085* (2013.01); *B62B 2202/52* (2013.01); *B62B 2204/04* (2013.01); *B62B 2204/06* (2013.01)

(58) Field of Classification Search
CPC ........................................................ B62B 1/20
See application file for complete search history.

(56) References Cited

U.S. PATENT DOCUMENTS

| | | | | |
|---|---|---|---|---|
| 5,876,047 A | * | 3/1999 | Dennis | ................... B62B 3/007 |
| | | | | 280/47.35 |
| 7,143,601 B1 | | 12/2006 | Jimenez | |
| 7,155,859 B1 | * | 1/2007 | Brooks | ................... A01K 97/06 |
| | | | | 206/315.11 |
| D646,208 S | * | 10/2011 | Ohnishi | ....................... D12/133 |
| 2001/0006073 A1 | * | 7/2001 | Patarra | ..................... A45B 3/00 |
| | | | | 135/16 |
| 2006/0279052 A1 | | 12/2006 | Marmah et al. | |

(Continued)

FOREIGN PATENT DOCUMENTS

WO        97/00802 A1    1/1997

OTHER PUBLICATIONS

Search Report for French Application No. 17 60283 dated Jul. 17, 2018 in 3 pages.

*Primary Examiner* — John D Walters
*Assistant Examiner* — James J Triggs
(74) *Attorney, Agent, or Firm* — Knobbe, Martens, Olson & Bear, LLP

(57) ABSTRACT

A beach cart includes a frame mounted on rollers, and a sun shade integrally secured in a non-detachable manner, to at least one other element of the beach cart. The beach cart can also include at least one seat carried by the frame. The seat can be operable between a retracted storage position and a deployed extended use position.

9 Claims, 3 Drawing Sheets

(56) References Cited

U.S. PATENT DOCUMENTS

2008/0048417 A1* 2/2008 Schroeder ............ A01M 31/00
                                                            280/656
2010/0187781 A1    7/2010 Coetzee
2014/0077467 A1    3/2014 Galante

* cited by examiner

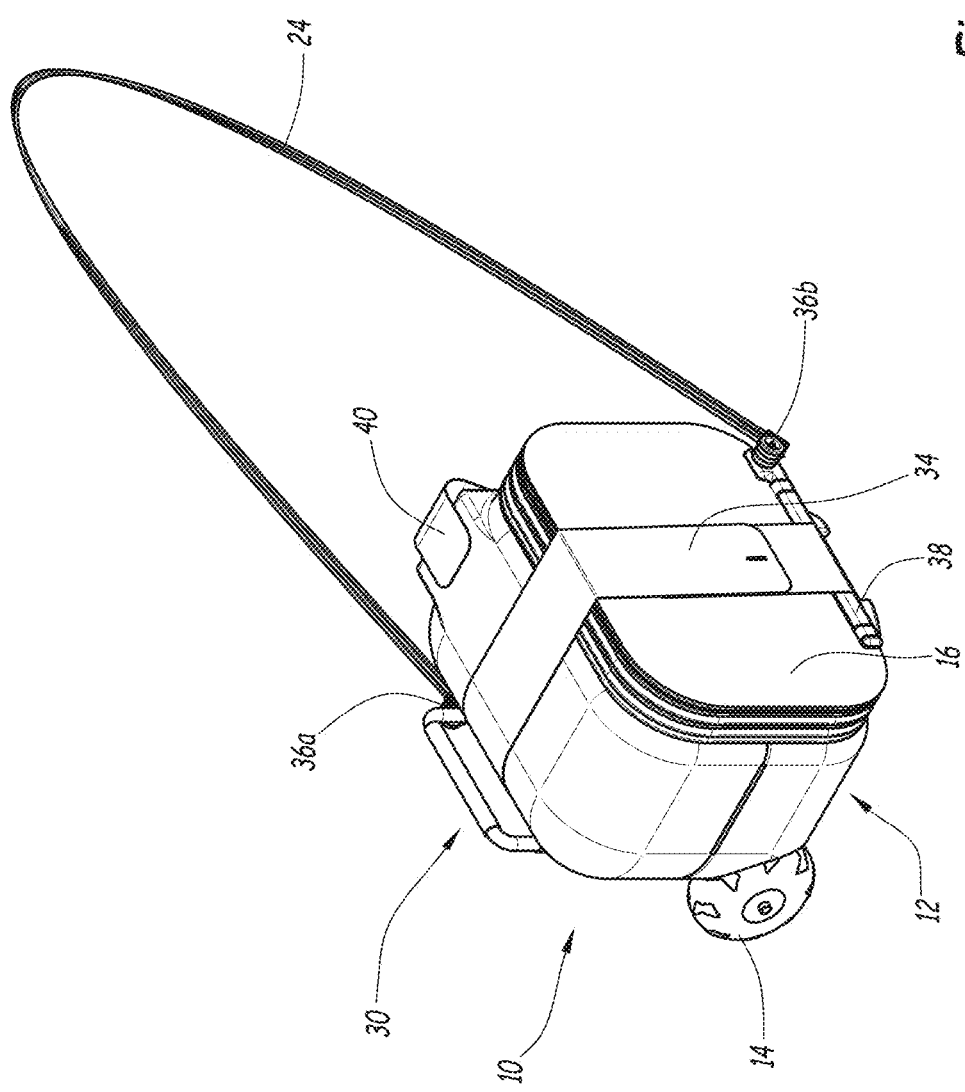

ALL-IN-ONE BEACH CART

CROSS-REFERENCE TO RELATED APPLICATIONS

This application claims priority to French Patent Application No. FR 17 60283 filed on Oct. 31, 2017, the entire disclosure of which, including the specification, the drawings, and the claims, is hereby incorporated by reference in its entirety.

FIELD OF THE INVENTION

The present invention relates to a beach cart.

BACKGROUND OF THE INVENTION

A beach cart usually comprises a frame on castor wheels, and makes it possible to transport heavy or bulky loads, such as a cooler, on to the beach.

The objective of the present invention in particular is to further develop such a beach cart, in order to make it as practical and functional as possible.

SUMMARY OF THE INVENTION

To this end, the object of the present invention in particular relates to a beach cart, comprising a frame mounted on rolling elements, characterised in that it comprises a sun shade, integrally secured in a non-detachable manner, to at least one other element of the beach cart.

By integrating the sun shade with the beach cart, it is no longer necessary for it to be separately transported in addition to the beach cart.

A beach cart according to the invention may further comprise one or more of the following characteristic features, taken into consideration alone or in accordance with any technically feasible combination:

- The sun shade comprises of at least three arches, and at least one fabric sheeting that extends between the arches.
- Each arch extends between a first end and a second end, the first ends of all the arches being connected to the first pivot links all joined in an articulated manner around the same given first axis, and the second ends of all the arches being connected to the second pivot links all joined in an articulated manner around the same given second axis.
- The first pivot links connect the first ends of the arches to the frame, in particular to a telescopic handle carried by the frame.
- The beach cart comprises at least one seat member integrally secured in a non-detachable manner to the frame, the seat member being operable between a retracted storage position and a deployed extended use position.
- The second pivot links connect the second ends of the arches to the at least one seat member.
- The beach cart comprises two seat members carried laterally on either side of the frame;
- the beach cart includes a cooler housed within the frame;
- the frame has a storage compartment for storing objects;
- each seat member comprises an inflatable structure, that is deflated in the storage position and inflated in the use position;
- the beach cart includes inflating means, in particular an air compressor, connected to the inflatable structure of each seat member, and housed in the frame;
- the sun shade has a gripping handle at its upper end;
- the frame comprises at least one anchoring element for anchoring in the sand, for example a post provided with a helical screw spline;
- the anchoring element is formed by a lower end of the sun shade;
- the beach cart comprises at least one electrical equipment unit, and a battery power pack for powering the electrical equipment unit;
- the beach cart comprises at least one solar panel for recharging the battery power pack.

BRIEF DESCRIPTION OF THE DRAWINGS

The invention will be better understood upon reading the description that follows here below, provided solely by way of example and with reference being made to the appended figures, among which:

FIG. 5 is a perspective view of the beach cart shown in FIG. 4, in the retracted configuration.

DETAILED DESCRIPTION OF THE PREFERRED EMBODIMENTS

Figure 1:
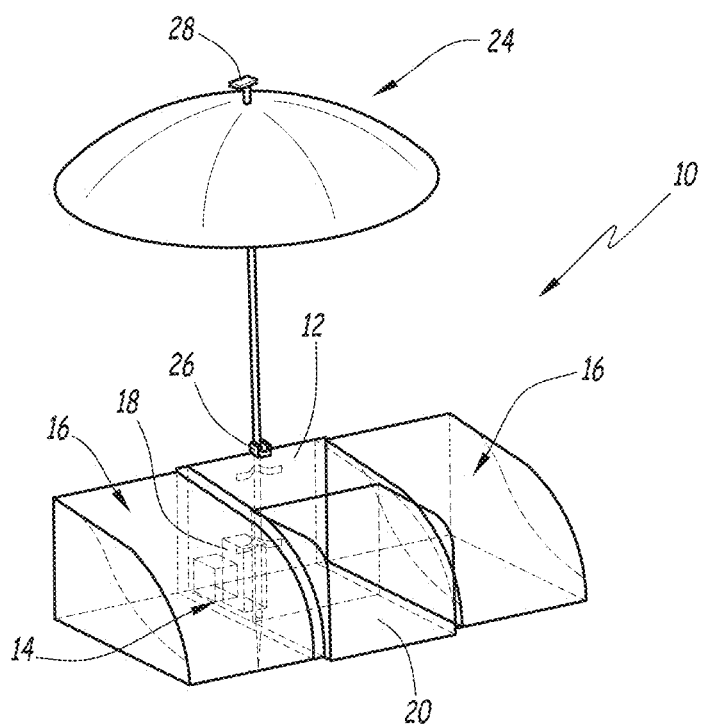
FIG. 1 is a schematic view from the front and in perspective of a beach cart according to a first exemplary embodiment of the invention, in the deployed configuration.
Figure 2:
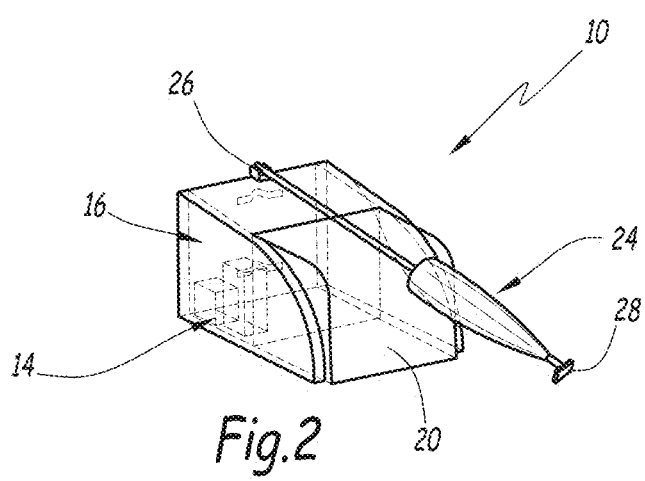
FIG. 2 is a view that is similar to that in FIG. 1, of the beach cart shown in FIG. 1 in the retracted configuration.
Figure 3:
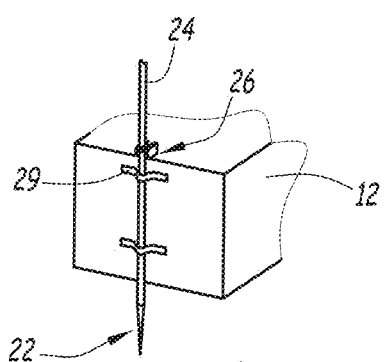
FIG. 3 is a schematic view from the rear and in perspective of a detail of the beach cart shown in FIG. 1.

Represented in the figures is a beach cart 10 according to one exemplary embodiment of the invention, respectively in the deployed configuration (FIG. 1) and in the retracted configuration (FIG. 2).

The beach cart 10 includes a frame 12 in the form of a box, mounted on castor wheels 14 that facilitate the movement of the beach cart 10. For example, the frame 12 comprises two castor wheels, arranged laterally on both sides of this frame 12.

The beach cart 10 according to the invention comprises at least one seat member 16, carried by the frame 12. In the example described, the beach cart 10 comprises two seat members 16, arranged laterally on both sides of the frame 12.

The seat member 16 is for example a recliner, but by way of a variant could comprise only a backrest without seat, or a seat without backrest.

In any case, each seat member 16 is operable between a retracted storage position (FIG. 2) and a deployed extended use position (FIG. 1).

More particularly, in the use position, the seat member 16 is usable by a user, who can in particular use it for sitting. However, in the storage position, the seat member 16 is retracted into or over the frame, that is to say that the beach cart 10 has a dimensional footprint equal to, or slightly greater than, that of the frame alone when the seat member 16 is in the storage position.

Various operating mechanisms for operating the seat member 16 are conceivable.

For example, each seat member 16 comprises an inflatable structure, that is deflated in the storage position and inflated in the use position. When the seat member 16 is deflated, it can then be stored in a housing provided for this purpose in the frame 12.

Advantageously, the beach cart 10 includes inflation means 18, in particular an air compressor, connected to the inflatable structure of each seat member 16, and housed in the frame 12. Thus, in this case, the inflation of the seat members 16 is automatic, after actuation of an activation command of the inflation means.

Preferably, the inflation means 18 are reversible, in order to also enable the automatic deflation of the seat members 16. Advantageously, the resilient means are provided for retracting the seat members 16 into their respective housing during the deflation thereof.

The inflation means 18 may on an optional basis include an outlet which is not connected to the seat members 16, in order to enable the inflation or deflation of external elements, such as buoys, inflatable boats or the like.

By way of a variant, the seat member 16 may be inflated manually, for example by means of an external pump.

Alternatively, any other operating mechanism of the seat member are conceivable.

For example, the seat member 16 may be foldable, in which case the operating mechanism may include cylinders that provide for the folding and unfolding of the seat member 16.

In accordance with another example, the seat member may be simply foldable against the frame 12.

In accordance with yet another example, the seat member may be mounted on rails and thus movable in translational motion from a housing of the frame 12 to its deployed position.

The beach cart 10 according to the invention is preferably intended to carry a number of other functional features, in a manner so as to enable a user to transport all of the equipment that they may need.

Thus, the beach cart 10 described comprises a cooler 20 housed in the frame. The term "cooler" is understood to refer to any apparatus unit that is capable of maintaining cold conditions within its interior. For example, the cooler 20 may be a mini refrigerator.

Advantageously, the frame 12 also comprises at least one storage compartment for storing objects. This compartment may for example be used to store cups or glasses, various cutlery, food stuffs, or any other object for use on the beach (books, magazines, pens, etc). Several separate compartments may be envisaged, each designed to accommodate a respective type of object.

In order to immobilise the beach cart 10 during its use, this beach cart 10 advantageously comprises at least one anchoring element 22 for anchoring in the sand. For example, the anchoring element 22 is formed by a post, and preferably by a post provided with a helical screw spline, facilitating the penetration of the post into the sand.

According to the embodiment described, the beach cart 10 comprises a sun shade 24. For example, the sun shade 24 is connected to the frame 12 by a pivot link 26 having an axis that is parallel to an axis of the castor wheels 14. Thus, the sun shade 24 is operable between a deployed extended use position (represented in FIG. 1), and a folded storage position (represented in FIG. 2).

Advantageously, the sun shade 24 is telescopic, which makes it possible to present a minimal dimensional footprint in the folded position. More particularly, the length of the folded sun shade 24 is slightly greater than that of the frame 12.

Preferably, the sun shade 24 has a gripping handle 28 at its upper end. Thus, this gripping handle 28 may be used, when the sun shade 24 is in the folded position, for pulling the beach cart 10.

In one preferred embodiment, the anchoring element 22 is formed by a lower end of the sun shade 24. In this case, this anchoring element 22 is telescopically connected to the rest of the sun shade 24, in a manner so as to be retracted into the sun shade 24 in the folded position. The frame 12 also includes retaining and guiding elements 29 for retaining and guiding the anchoring element 22, in which the anchoring element 22 slides.

Advantageously, the beach cart 10 also includes at least one electrical equipment unit, and a battery power pack for powering the electrical equipment unit.

The electrical equipment unit is for example an audio equipment unit, for playing music. By way of a variant, or on a supplementary basis, an electrical equipment unit is formed by the cooler 20 in the form of a mini-refrigerator.

The battery power pack is for example rechargeable by means of at least one solar panel carried by the beach cart 10. Preferably, the solar panel is carried by the sun shade 24.

By way of a variant, or in a complementary manner, the battery power pack is rechargeable by plugging it into the power supply mains.

Figure 4:
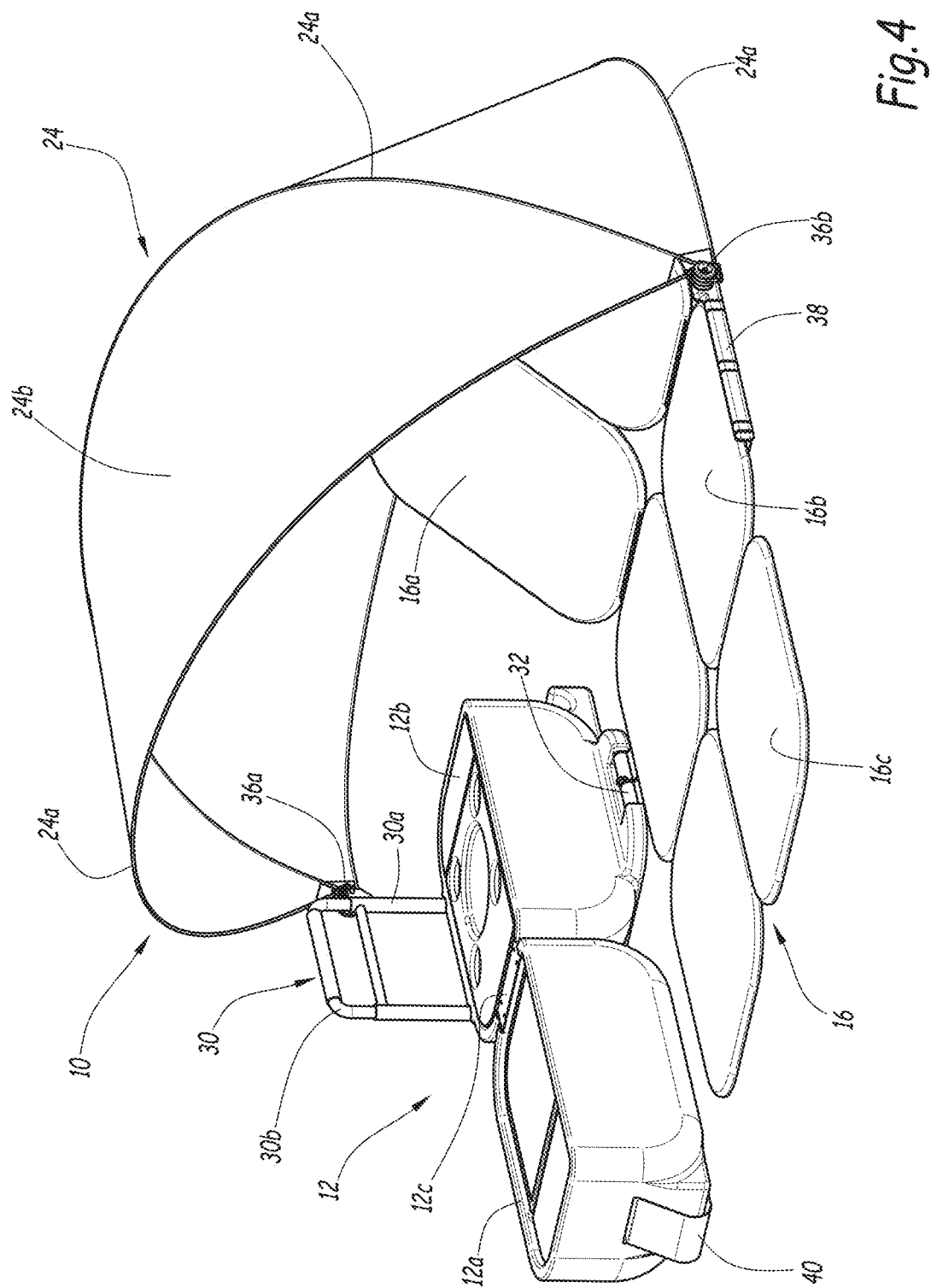
FIG. 4 is a perspective view of a beach cart according to a second exemplary embodiment of the invention, in the deployed configuration.

Represented in FIGS. 4 and 5 is a beach cart 10 according to a second exemplary embodiment of the invention. In these figures, the elements that are similar to those in the preceding figures are designated by identical references. The beach cart 10 is represented respectively in the deployed configuration (FIG. 4) and in the retracted configuration (FIG. 5).

The beach cart 10 includes a frame 12 in the form of a box, mounted on castor wheels 14 that facilitate the movement of the beach cart 10. For example, the frame 12 comprises two castor wheels, arranged laterally on both sides of this frame 12. It is to be noted that the castor wheels 14 have sufficiently large dimensions so as to enable the cart 10 to roll and thus travel effectively over the sand.

According to this mode of configuration, the frame 12 comprises two parts, more particularly an upper part 12a and a lower part 12b, of similar dimensions, connected to each other by a hinge 12c.

In the retracted configuration, the upper part 12a is disposed above the lower part 12b. In the deployed configuration, the upper part 12a is disposed adjacent to the lower part 12b.

One of the parts, preferably the upper part 12a, advantageously comprises at least one power supply device, for example a battery power pack and/or a solar panel. The solar panel may be used to recharge the battery power pack, or to directly power an electronic device. The connection means for connecting with an electronic device are provided in the upper part 12a. It is thus possible to connect an electronic device, for example an audio equipment, a smartphone or any other electronic device, to the battery and/or to the solar panel.

The other of the parts, preferably the lower part 12b, comprises a housing for objects, and/or a cooler, and/or a refrigerator powered by the battery power pack and/or the solar panel.

Advantageously, the housing comprises a lock, thereby providing for it to be safely locked, and making it possible for users to leave their valuable objects within the interior while going off to bathe.

The distribution of the various different equipment units described here above in the parts 12a, 12b may be different in variants embodiments.

The frame 12 further comprises a telescopic handle 30, providing a user with the means to pull the beach cart 10. The telescopic handle 30 is preferably carried by the lower part 12B. It comprises fixed lower tubes 30a, and a handle element 30b that is capable of sliding in a telescopic manner in the fixed lower tubes 30a.

The beach cart 10 comprises at least one seat member 16, carried by the frame 12. In the example described, the beach cart 10 comprises two seat members 16 that are connected to each other.

Each seat member 16 is operable between a retracted storage position (FIG. 5) and a deployed extended use position (FIG. 4).

More particularly, in the use position, the seat member 16 is usable by a user, who in particular is able use it to sit on. In contrast, in the storage position, the seat member 16 is retracted by being folded over the frame 12.

A first of the seat members 16 is connected to the frame 12 in a non-detachable manner. The term "non-detachable" is used to indicate that the seat member 16 cannot be detached from the frame 12 during normal use of the beach cart 10.

To this end, this first seat member 16 is connected to the frame 12 by a pivot link 32, arranged at the front of the frame 12, opposite the handle 30. The pivot link 32 is for example carried by the lower part 12b of the frame 12.

The second seat member 16 is connected to the first seat member in a non-detachable manner, in particular by at least one hinge.

Each seat member 16 includes a plurality of panels, for example made of foam, forming the seat member 16 in the deployed configuration, and folded over each other in the retracted configuration.

More particularly, each seat member 16 comprises a first panel 16a that forms a backrest, a second panel 16b that forms a seat, and a third panel 16c designed for accommodating the legs of a user sitting on the seat. By way of a variant, the seat member 16 has no backrest and/or has no third panel.

Each first panel 16a preferably has a stand member on a back side, making it possible for this first panel 16a to be held in place inclined relative to the second panel 16b, as has been represented in FIG. 4.

The first panel 16a of each seat member 16 is connected to the second panel 16b of the same seat member 16, in a non-detachable manner. The third panel 16c of each seat member 16 is connected to the second panel 16b of the same seat member 16, in a non-detachable manner.

Advantageously, the beach cart 10 comprises a retaining element 34 for retaining the seat members 16 in the retracted configuration, in particular a retaining band, for example a Velcro band. Advantageously, this retaining band 34 also makes it possible to retain the upper part 12a and the lower part 12b of the frame on one another in the retracted configuration.

The beach cart 10 further includes a sun shade 24. In the present invention, the term "sun shade" is understood in the broad sense, as any element that provides the means to protect the user from the sun.

In accordance with this second embodiment, the sun shade 24 comprises at least three arches 24a, and at least one fabric sheeting 24b extending between the arches 24a.

The arches 24a have a form of rest corresponding to the deployed configuration and can be folded into the retracted configuration. The arches 24a have shape retention memory, such that they are returned to their form of rest when no stress is applied to them.

Each arch 24a extends between a first end and a second end, the first ends of all the arches being connected to the first pivot links 36a all joined in an articulated manner about the same given first axis, and the second ends of all the arches 24a being connected to the second pivot links 36b all joined in an articulated manner around the same given second axis.

The first pivot links 36a connect the first ends of the arches to the frame 12. More particularly, in the example described, the first pivot links 36a are carried by the telescopic handle 30, preferably on one of the fixed lower tubes 30a.

The second pivot links 36b connect the second ends of the arches 24a to the at least one seat member 16, and more particularly to the second seat member. To this end, the second panel 16b of the second seat member bears a stiffening bar 38 that carries the second pivot links 36b. The stiffening bar 38 extends along the second panel 16b.

The fabric sheeting 24b is made from a material that is impermeable to the sun's rays, in particular from the same material as that used for a conventional sun umbrella.

Advantageously, the sun shade 24 comprises, in its lower part, a bead section capable of being filled with sand, in order to ensure the stability thereof.

By way of a variant, or in a complementary manner, the sun shade has coiling ('sardine') fixation straps adapted to be planted in the sand.

As is shown in FIG. 5, the frame 12 comprises a retaining member 40 for retaining the arches 24a in the folded configuration. It should be noted that, for the sake of simplification, the arches 24a are represented in an intermediate position in FIG. 5.

It should be noted that the invention is not limited to the embodiment previously described above, and could be presented as various complementary variants.

For example, the beach cart 10 could have other additional functions.

Moreover, the elements described here above are not specific to any one embodiment. It could therefore be possible to provide a cart having certain characteristic features derived from the first embodiment and other characteristic features derived from the second embodiment.

What is claimed is:

1. A beach cart comprising:
   a frame mounted on rollers, and
   a sun shade integrally secured in a non-detachable manner, to at least one other element of the beach cart
   wherein the sun shade comprises at least three arches, and at least one fabric sheeting that extends between the arches,
   each arch extends between a first end and a second end, the first ends of all the arches being connected to first pivot links all joined in an articulated manner around a same given first axis, and the second ends of all the arches being connected to second pivot links all joined in an articulated manner around a same given second axis, and
   the arches have shape retention memory, such that they are returned to a form of rest when no stress is applied to them.

2. A beach cart according to claim 1, wherein the first pivot links connect the first ends of the arches to the frame, in particular to a telescopic handle carried by the frame.

3. A beach cart according to claim 1, comprising at least one seat integrally secured in a non-detachable manner to the frame, the seat being operable between a retracted storage position and an extended use position.

4. A beach cart according to claim 3, wherein:
the sun shade comprises of at least three arches, and at least one fabric sheeting that extends between the arches,
each arch extends between a first end and a second end, the first ends of all the arches being connected to first pivot links all joined in an articulated manner around a same first axis, and the second ends of all the arches being connected to second pivot links all joined in an articulated manner around a same second axis, and
the second pivot links connect the second ends of the arches to the at least one seat member.

5. A beach cart according to claim 1, including a cooler housed in the frame.

6. A beach cart according to claim 1, wherein the frame comprises at least one anchor configured to anchor the sun shade in the sand.

7. A beach cart according to claim 6, wherein the anchor comprises a post provided with a helical screw spline.

8. A beach cart according to claim 1, comprising at least electrical equipment and a battery power pack for powering the electrical equipment.

9. A beach cart according to claim 8, comprising at least one solar panel for recharging the battery.

* * * * *